US012423055B2

United States Patent
Joo et al.

(10) Patent No.: US 12,423,055 B2
(45) Date of Patent: Sep. 23, 2025

(54) PROCESSING APPARATUS AND METHOD OF PROCESSING ADD OPERATION THEREIN

(71) Applicants: Samsung Electronics Co., Ltd., Suwon-si (KR); Seoul National University R&DB Foundation, Seoul (KR)

(72) Inventors: Deokjin Joo, Seongnam-si (KR); Hossein Moradian Sardroudi, Seoul (KR); Sujeong Jo, Hongseong-gun (KR); Kiyoung Choi, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 1213 days.

(21) Appl. No.: 16/683,626

(22) Filed: Nov. 14, 2019

(65) Prior Publication Data

US 2020/0159495 A1 May 21, 2020

Related U.S. Application Data

(60) Provisional application No. 62/767,692, filed on Nov. 15, 2018.

(30) Foreign Application Priority Data

Feb. 20, 2019 (KR) .................. 10-2019-0020053

(51) Int. Cl.
*G06F 7/505* (2006.01)
*G06F 7/504* (2006.01)

(52) U.S. Cl.
CPC .............. *G06F 7/505* (2013.01); *G06F 7/504* (2013.01)

(58) Field of Classification Search
CPC ................... G06F 7/50; G06F 7/505–5095
See application file for complete search history.

(56) References Cited

U.S. PATENT DOCUMENTS

| 5,134,579 A * | 7/1992 | Oki ...................... G06F 7/506 |
| | | 708/706 |
| 8,468,192 B1 * | 6/2013 | Langhammer ........ G06F 7/5324 |
| | | 708/620 |
| 10,380,753 B1 * | 8/2019 | Csordás ................. G06N 3/045 |
| 2009/0228538 A1 | 9/2009 | Nagano et al. |
| 2014/0122555 A1 * | 5/2014 | Hickmann ................ G06F 7/57 |
| | | 708/523 |

(Continued)

FOREIGN PATENT DOCUMENTS

| KR | 10-2017-0023708 A | 3/2017 |
| WO | WO 2007/052499 A1 | 5/2007 |

OTHER PUBLICATIONS

Chen on "Parallel Adders" Lecture Notes. Retrieved on [Mar. 22, 2023]. Retrieved on the Internet <https://users.encs.concordia.ca/~asim/COEN_6501/Lecture_Notes/L2_Notes.pdf> (Year: 2005).*

(Continued)

*Primary Examiner* — Carlo Waje
(74) *Attorney, Agent, or Firm* — NSIP Law

(57) ABSTRACT

A method of processing an add operation in a processing apparatus includes acquiring sub-operands from input operands each having an n-bit precision, acquiring intermediate addition results by performing add operations of sub-operands in parallel by using adders, bit-shifting each of the intermediate addition results such that the intermediate addition results correspond to original bit positions in the input operands, and outputting a final addition result of the add operations of the input operands based on the bit-shifted intermediate addition results.

11 Claims, 14 Drawing Sheets

(56) References Cited

U.S. PATENT DOCUMENTS

| | | |
|---|---|---|
| 2014/0337262 A1 | 11/2014 | Kato et al. |
| 2015/0193202 A1 | 7/2015 | Chen et al. |
| 2017/0357891 A1 | 12/2017 | Judd et al. |
| 2019/0114140 A1* | 4/2019 | Langhammer .......... G06F 7/503 |

OTHER PUBLICATIONS

Anonymous, "Parsing" Definition on Google.com (Year: 2024).*
Anonymous, "Parsing" Definition on https://www.merriam-webster.com/dictionary/parsing (Year: 2024).*
Anonymous, "Multiples" Definition on Google.com (Year: 2024).*
Hennessy et al., "Computer Organization and Design: The Hardware/Software Interface", Fifth Edition, Chapter 1 pp. 2-59, 2014. Retrieved from <https://ict.iitk.ac.in/wp-content/uploads/CS422-Computer-Architecture-ComputerOrganizationAndDesign5thEdition2014.pdf> (Year: 2014).*
Peddawad et al., "Matrix-Matrix Multiplication Using Systolic Array Architecture in Bluespec," Systolic Array & Bluespec, CS6230: CAD for VLSI, 8 pages in English.
Rastegari et al., "XNOR-Net: ImageNet Classification Using Binary Convolutional Neural Networks," Allen Institute for AI, University of Washington, 17 pages in English.
Courbariaux et al., "Binarized Neural Networks: Training Neural Networks with Weights and Activations Constrained to +1 or −1," Advances in neural information processing systems 2016, 11 pages in English.
Moradian et al., "Reconfigurable Multi-Input Adder Design for Deep Neural Network Accelerators," 2018 IEEE, ISOCC 2018, pp. 212-213.

* cited by examiner

FIG. 2A
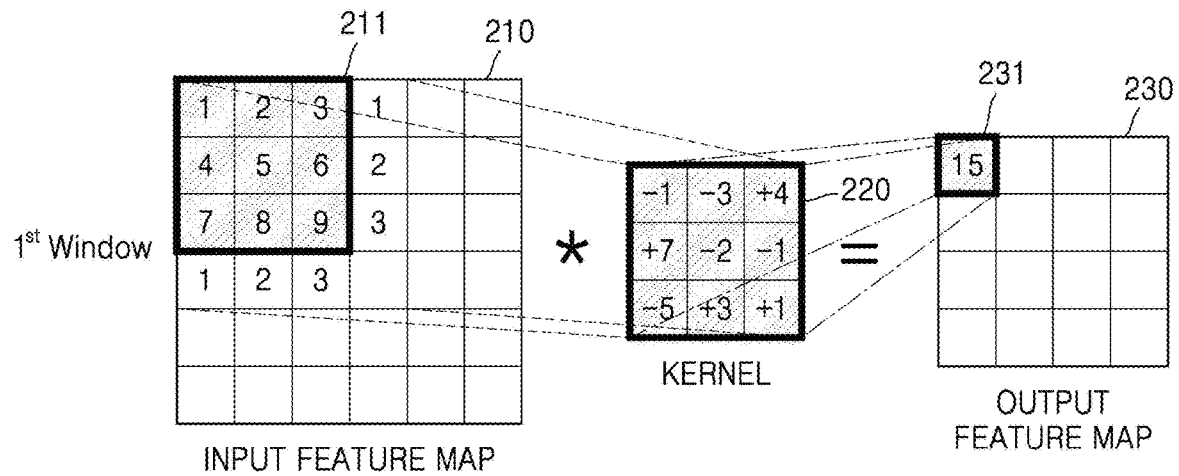
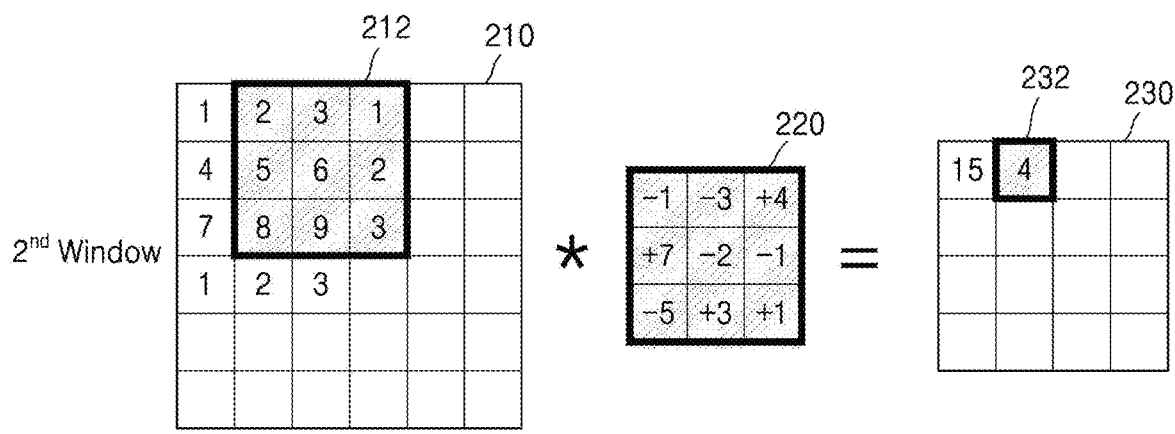
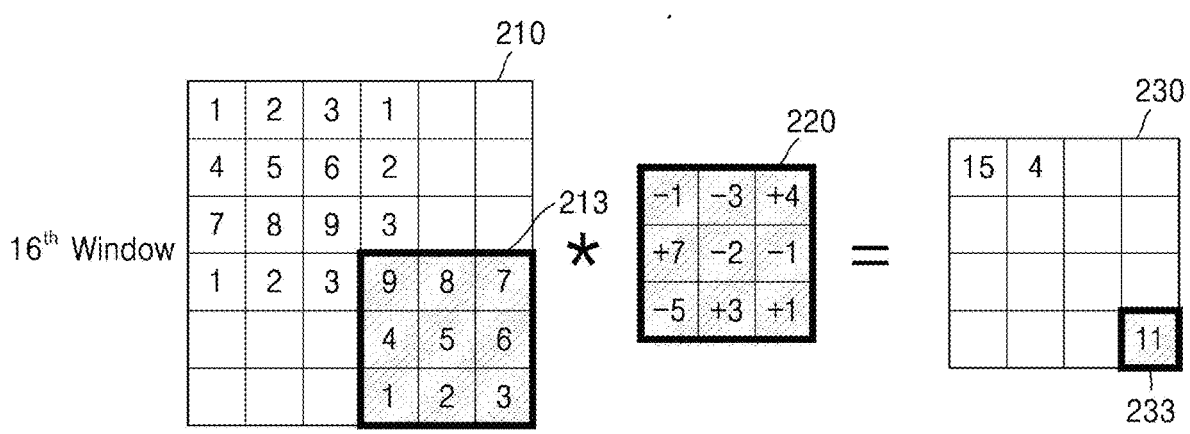

<CARRY OF BIT LENGTH ($\log_2 m$) CORRESPONDING TO DEPTH IS GENERATED>

PROCESSING APPARATUS AND METHOD OF PROCESSING ADD OPERATION THEREIN

CROSS-REFERENCE TO RELATED APPLICATIONS

This application claims the benefit under 35 USC § 119(a) of Korean Patent Application No. 10-2019-0020053, filed on Feb. 20, 2019 in the Korean Intellectual Property Office, and U.S. Patent Application No. 62/767,692, filed on Nov. 15, 2018 in the United States Patent and Trademark Office, the entire disclosures of which are incorporated herein by reference for all purposes.

BACKGROUND

1. Field

The following description relates to processing apparatuses and methods of processing add operations in processing apparatuses, and more particularly, to methods of processing add operations of parameters of a neural network in neural processors that process the neural network.

2. Description of Related Art

A neural network refers to a computational architecture that models a biological brain. As neural network technology has developed, research has been conducted on analysis of input data by utilizing a neural network and extraction of valid information in various electronic systems. An apparatus for processing a neural network processes a large number of arithmetic operations by performing add and multiplication operations on complex input data. Therefore, in order to extract desired information by processing and analyzing a large amount of input data in real-time by using a neural network, a technique capable of effectively processing arithmetic operations such as add operations or multiplication operations on the neural network is necessary.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of processing an add operation in a processing apparatus, the method includes: acquiring sub-operands corresponding to bit values of each of bit sections by dividing a plurality of input operands that are input to the processing apparatus and each have an n-bit precision into the bit sections each having a predetermined bit size, wherein n is a natural number; acquiring intermediate addition results for each of the bit sections by performing add operations of the sub-operands acquired from each corresponding bit sections in the plurality of input operands in parallel using a plurality of adders included in the processing apparatus; bit-shifting each of the intermediate addition results such that the intermediate addition results correspond to original bit positions in the input operands; and outputting a result of an add operation of the input operands by performing an add operation of the bit-shifted intermediate addition results.

The predetermined bit size may be k bits, obtaining the intermediate addition results may include obtaining the intermediate addition results by using multi-input adders each having a k-bit precision performing add operations of the sub-operands each having a k-bit precision, and k may be a natural number less than n.

The number of input operands may be m, each of the intermediate addition results may include a result of executing an add operation of m sub-operands, each having the k-bit precision, acquired from each corresponding bit section in the m input operands, each of the intermediate addition results may have a precision of $(k+\log_2 m)$ bits, and m may be a natural number.

Each of the plurality of input operands may be divided into (n/k) bit sections, and the intermediate addition results may include intermediate addition results from an intermediate addition result of sub-operands of a first bit section of each of the input operands to an intermediate addition result of sub-operands of (n/k)-th bit section of each of the input operands, performed in parallel by the adders.

The method may include determining whether there is a zero-bit section in which a sub-operand has a zero-value, from among the first bit section to the (n/k)-th bit section; and controlling an adder aligned to the zero-bit section, from among the plurality of adders, to skip an add operation, when it is determined that there is the zero-bit section.

The bit-shifting may include bit-shifting each of the intermediate addition results by integer-multiple-of-k bits to correspond to the original bit positions in each of the input operands.

In another general aspect, a method of processing an add operation in a processing apparatus, the method includes: acquiring sub-operands corresponding to bit values of each of bit sections by dividing a plurality of input operands that are input to the processing apparatus and each have an n-bit precision into the bit sections each having a certain bit size, wherein n is a natural number; acquiring intermediate addition results for each of the bit sections by repeatedly performing an add operation of the sub-operands acquired from each corresponding bit sections in the plurality of input operands and a carry output through an add operation performed in a previous cycle, according to an order of the bit sections by using an adder included in the processing apparatus for a plurality of cycles; bit-shifting each of the intermediate addition results to correspond to an original bit position in the input operands; and outputting a result of add operations of the input operands based on the intermediate addition results that are bit-shifted.

The certain bit size may be k bits, obtaining the intermediate addition results may include obtaining the intermediate addition results by using a multi-input adder having a k-bit precision performing add operations of the sub-operands each having a k-bit precision and the carry in each cycle, and k may be a natural number less than n.

The number of input operands may be m, each of the intermediate addition results may have a precision of $(k+\log_2 m)$ bits, the carry may correspond to $(\log_2 m)$ bit values from a most significant bit (MSB) in an intermediate addition result of $(k+\log_2 m)$ bits obtained in a previous cycle, and m may be a natural number.

For example, m and k may satisfy $k \log_2 m$, and the number of the cycles may be maximum (n/k).

For example, $(\log_2 m)$ bit values from the MSB in the intermediate addition result obtained from a last cycle may be set as 0.

In another general aspect, a processing apparatus includes: a memory; and a processing unit to process an add operation, wherein the processing unit acquires sub-operands corresponding to bit values of each of bit sections by dividing a plurality of input operands that are input to the processing unit and each have an n-bit precision into the bit sections each having a certain bit size, wherein n is a natural number, acquires intermediate addition results for each of the bit sections by performing in parallel add operations of the sub-operands obtained from corresponding bit sections in the plurality of input operands by using a plurality of adders included in the processing unit, bit-shifts each of the intermediate addition results so that the intermediate addition results correspond to original bit positions in the input operands, and outputs a result of an add operation of the input operands by performing an add operation of the bit-shifted intermediate addition results.

The certain bit size may be k bits, the processing unit may acquire the intermediate addition results by using multi-input adders each having a k-bit precision performing add operations of the sub-operands each having a k-bit precision, and k may be a natural number less than n.

The number of input operands may be m, each of the intermediate addition results may include a result of performing an add operation of the m sub-operands each having the k-bit precision and obtained from the corresponding bit sections in each of the m input operands, each of the intermediate addition results may have a precision of $(k+\log_2 m)$ bits, and m may be a natural number.

Each of the plurality of input operands may be divided into (n/k) sub-operands, and the intermediate addition results may include intermediate addition results from an intermediate addition result of sub-operands of a first bit section of each of the input operands to an intermediate addition result of sub-operands of (n/k)-th bit section of each of the input operands, performed in parallel by the adders.

The processing unit may determine whether there is a zero-bit section, in which a sub-operand has a zero-value, from among the first bit section to the (n/k)-th bit section, and when it is determined that there is the zero-bit section, the processing unit may control an adder aligned to the zero-bit section, from among the plurality of adders, to skip the add operation.

In another general aspect, a processing apparatus includes: a memory; and a processing unit to process an add operation, wherein the processing unit acquires sub-operands corresponding to bit values of each of bit sections by dividing a plurality of input operands that are input to the processing unit and each have an n-bit precision into the bit sections each having a certain bit size, wherein n is a natural number, acquiring intermediate addition results for each of the bit sections by repeatedly performing an add operation of the sub-operands acquired from each corresponding bit sections in the plurality of input operands and a carry output through an add operation performed in a previous cycle, according to an order of the bit sections by using an adder included in the processing unit for a plurality of cycles, bit-shifts each of the intermediate addition results so that the intermediate addition results correspond to an original bit position in the input operands, and outputs a result of add operations of the input operands based on the bit-shifted intermediate addition results.

The certain bit size may be k bits, the number of input operands may be m, the processing unit may obtain the intermediate addition results by using a multi-input adder having a k-bit precision performing add operations of the sub-operands each having a k-bit precision and the carry in each cycle, each of the intermediate addition results may have a precision of $(k+\log_2 m)$ bits, the carry may correspond to $(\log_2 m)$ bit values from a most significant bit (MSB) in an intermediate addition result of $(k+\log_2 m)$ bits obtained in a previous cycle, m and k may satisfy $k \log_2 m$, and m may be a natural number and k may be a natural number less than n.

The number of the cycles may be maximum (n/k), and $(\log_2 m)$ bit values from the MSB in the intermediate addition result obtained from a last cycle may be set as 0.

The processing apparatus may include a neural processor to process a neural network, and the add operation of the input operands may include an add operation of parameters of the neural network.

Other features and aspects will be apparent from the following detailed description, the drawings, and the claims.

BRIEF DESCRIPTION OF THE DRAWINGS

FIGS. 2A and 2B are diagrams illustrating a convolution operation in a neural network.

Figure 1:
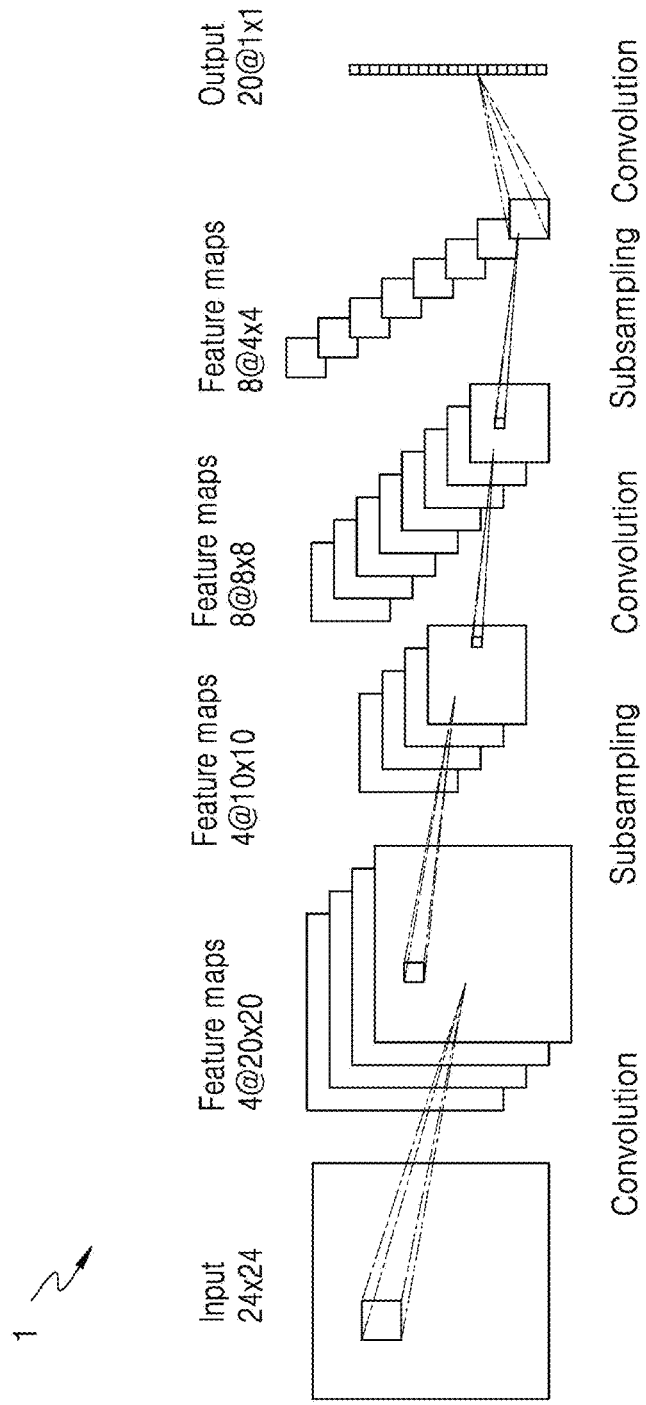
FIG. 1 is a diagram of an architecture of a neural network according to an example.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions are exemplary to merely describe the examples, and the scope of the examples is not limited to the descriptions provided in the present specification. Various varies and modifications can be made thereto by those of ordinary skill in the art.

Although terms of "first" or "second" may be used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

As used herein, the term "and/or" includes any and all combinations of one or more of the associated listed items. Expressions such as "at least one of," when preceding a list of elements, modify the entire list of elements and do not modify the individual elements of the list.

With respect to the terms used in examples of the disclosure, general terms currently and widely used are selected in view of function with respect to the disclosure. However, the terms may vary according to an intention of a technician practicing in the pertinent art, an advent of new technology, etc. In specific cases, terms may be chosen arbitrarily, and in this case, definitions thereof will be described in the description of the corresponding disclosure. Accordingly, the terms used in the description should not necessarily be construed as simple names of the terms, but be defined based on meanings of the terms and overall contents of the present disclosure.

The terms "consist(s) of" or "include(s) (or comprise(s))" should not be interpreted or understood as including, without exception, all of the plurality of elements or the plurality of steps disclosed in the description. In other words, it should be understood that some of the elements or some of the steps may not be included, or that additional elements or steps may be further included.

Examples will be described in detail below with reference to accompanying drawings. However, the present disclosure may be implemented in various manners, and is not limited to one or more examples described herein.

FIG. 1 is a diagram of an architecture of a neural network 1 according to an example.

Referring to FIG. 1, the neural network 1 may be an architecture of a deep neural network (DNN) or n-layers neural network. The DNN or the n-layer neural network may correspond to convolutional neural networks (CNN), recurrent neural networks (RNN), deep belief networks, restricted Boltzman machines, etc. For example, the neural network 1 may be implemented as the CNN, but is not limited thereto. In FIG. 1, some convolutional layers in the CNN that is an example of the neural network 1 are shown, but the CNN may further include a pooling layer, a fully connected layer, etc., in addition to the convolutional layers shown in FIG. 1.

The neural network 1 may be implemented as an architecture having a plurality of layers including input images, feature maps, and outputs. In the neural network 1, a convolution operation with a filter referred to as a kernel is performed on an input image, and as a result, feature maps are output. Output feature maps generated herein undergo a convolution operation with the kernel as input feature maps, and then, new feature maps are output. As a result of repeatedly performing the convolution operation, a result of recognizing features of the input image through the neural network 1 may be output.

For example, when an image having a size of 24×24 pixels is input to the neural network 1 of FIG. 1, the input image may be output as four-channel feature maps having a size of 20×20 pixels through the convolutional operation with the kernel. After that, the feature maps of 20×20 pixels are reduced in size through the repeated convolution operations, and finally, features having a size of 1×1 pixel may be output. The neural network 1 filters and outputs robust features that may represent an entire image from an input image by repeatedly performing convolution operations and sub-sampling (or pooling) operations in various layers, and draws a result of recognizing the input image through the output final features.

Figure 2B:
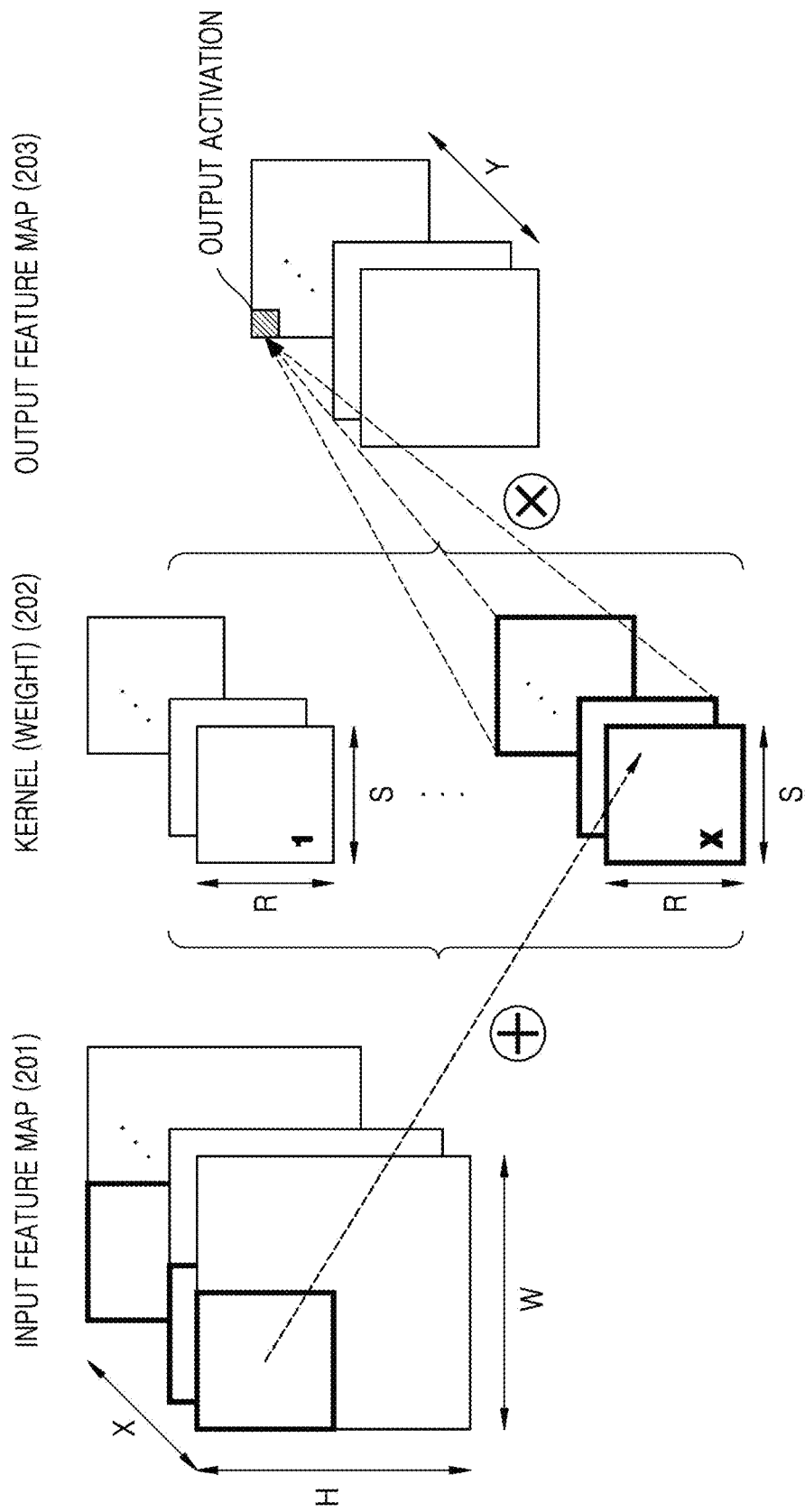

FIGS. 2A and 2B are diagrams illustrating a convolution operation in a neural network.

In the example of FIG. 2A, it is assumed that an input feature map 210 has a size of 6×6 pixels, a kernel 220 has a size of 3×3 pixels, and an output feature map 230 has a size of 4×4 pixels, but the configuration is not limited thereto, that is, the neural network may include feature maps and kernels having various sizes. Also, values defined in the input feature map 210, the kernel 220, and the output feature map 230 are exemplary values, and the configuration is not limited thereto.

The kernel 220 performs the convolution operation while sliding in units of window (or tile) having a size of 3×3 pixels in the input feature map 210. The convolution operation is an operation of obtaining each pixel value in the output feature map 230 by adding values that are obtained by multiplying each pixel value in a window of the input feature map 210 by a weight of each element at a corresponding location in the kernel 220. The kernel 220 first performs the convolution operation with a first window 211 in the input feature map 210. That is, pixel values 1, 2, 3, 4, 5, 6, 7, 8, and 9 in the first window 211 are respectively multiplied with weights −1, −3, +4, +7, −2, −1, −5, +3, and +1 of elements in the kernel 220, and as a result, values −1, −6, 12, 28, −10, −6, −35, 24, and 9 are obtained. Next, obtained values −1, −6, 12, 28, −10, −6, −35, 24, and 9 are all added to obtain a value 15, and a pixel value 231 in a row 1, column 1 in the output feature map 230 is determined as 15. Here, the pixel value 231 at row 1, col. 1 of the output feature map 230 corresponds to the first window 211.

Likewise, the convolution operation between a second window 212 of the input feature map 210 and the kernel 220 is performed, and a pixel value 232 at row 1, col. 2 of the output feature map 230 is determined as 4. Finally, the convolution operation between a sixteenth window 213, that is, the last window of the input feature map 210, and the kernel 220 is performed, and then, a pixel value 233 at row 4, col. 4 of the output feature map 230 is determined as 11.

The convolution operation between one input feature map 210 and one kernel 220 may be performed by repeatedly performing multiplication operations between corresponding element values in the input feature map 210 and the original kernel 220 and add operations of multiplied results, and the output feature map 230 is generated as the result of the convolution operation. Therefore, in order to perform the convolution operation, a multiplier circuit for performing the multiplication operation and an adder circuit for performing the add operation are necessary.

Although FIG. 2A illustrates a two-dimensional convolution operation, the convolution operation may correspond to a three-dimensional convolution operation having input feature maps, kernels, and output feature maps of a plurality of channels. This will be described in detail with reference to FIG. 2B.

Referring to FIG. 2B, input feature maps 201 may come from X channels, and an input feature map of each channel may have a size of row H and col. W (X, W, and H are natural numbers). Each of kernels 202 has a size of row R, col. S, and the kernels 202 may have channels, the number of which corresponds to the number of channels (X) of the input feature maps 201 and the number of channels (Y) of the output feature maps 203 (R, S, and Y are natural numbers). The output feature maps 203 are generated through the three-dimensional convolution operation between the input feature maps 201 and the kernels 202, and there may be Y channels according to the convolution operation.

Processes of generating the output feature map through the convolution operation between one input feature map and one kernel are the same as those of FIG. 2A, and the two-dimensional convolution operation described above with reference to FIG. 2A is repeatedly performed between the input feature maps 201 of all channels and the kernels 202 of all channels to generate the output feature maps 203 of all channels. Therefore, in order to actually perform the convolution operations of the neural network, a lot of multiplication operations and add operations have to be processed.

Figure 3:
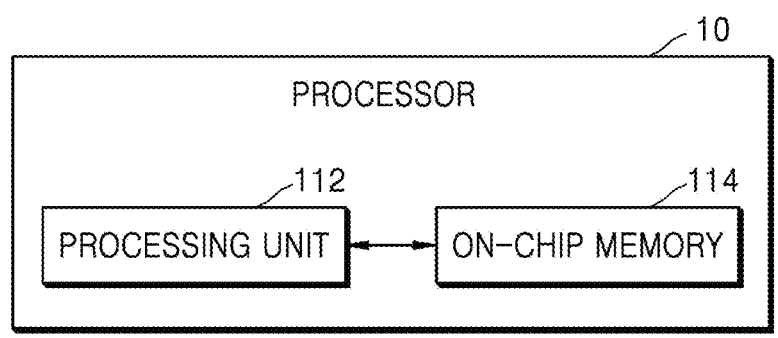
FIG. 3 is a block diagram showing hardware of a processing apparatus according to an example.

FIG. 3 is a block diagram showing hardware of a processing apparatus 10 according to an example.

Referring to FIG. 3, the processing apparatus 10 includes a processing unit 112 and an on-chip memory 114. Only some components related to the example of the processing apparatus 10 are shown in FIG. 3. Therefore, one of ordinary skill in the art would appreciate that other universal components than the components shown in FIG. 3 may be further included in the processing apparatus 10.

The processing apparatus 10 may correspond to one or more processors included in various kinds of computing devices including personal computers (PC), server devices, mobile devices (smartphones, tablet devices, etc.), embedded devices, autonomous vehicles, wearable devices, augmented reality (AR) devices, Internet of Things (IoT) devices, etc. For example, the processing apparatus 10 may correspond to a processor such as a central processing unit (CPU), a graphics processing unit (GPU), an application processor (AP), etc., or a neural processor that processes neural network data, but is not limited thereto.

The processing unit 112 of the processing apparatus 10 performs overall operations for controlling a computing device including the processing apparatus 10. For example, the processing unit 112 executes programs stored on the on-chip memory 114 or an off-chip memory (not shown), to control the processing apparatus 10 and the computing device including the processing apparatus 10.

The on-chip memory 114 is hardware for storing various data processed in the processing apparatus 10 with the off-chip memory, and the on-chip memory 114, for example, may store data processed or to be processed in the processing apparatus 10. In addition, the on-chip memory 114 and the off-chip memory may store applications, drivers, etc. to be driven by the processing apparatus 10.

The on-chip memory 114 and the off-chip memory may each include at least one of a volatile memory and a non-volatile memory. Examples of the non-volatile memory include read only memory (ROM), programmable ROM (PROM), electrically programmable ROM (EPROM), electrically erasable and programmable ROM (EEPROM), flash memories, phase-change random access memory (PRAM), magnetic RAM (MRAM), resistive RAM (RRAM), ferroelectric RAM (FeRAM), etc. Examples of the volatile memory include dynamic RAM (DRAM), static RAM (SRAM), synchronous DRAM (SDRAM), PRAM, MRAM, RRAM, FeRAM, etc. In the example, the on-chip memory 114 and the off-chip memory may each include at least one of hard disk drive (HDD), solid state drive (SSD), compact flash (CF), secure digital (SD), micro-SD, mini-SD, extreme digital (xD), and a memory stick.

The processing unit 112 is a hardware unit processing various operations, for example, various arithmetic operations such as add operations, multiplication operations, and elementary function operations. Therefore, the processing unit 112 may be implemented as a combination of a plurality of logic gate arrays that are circuit logics for performing various arithmetic operations, and the circuit logics may include an adder circuit, a multiplier circuit, etc.

When the processing apparatus 10 corresponds to a neural processor processing the neural network, the processing unit 112 may include a plurality of adder circuits, a plurality of multiplier circuits, etc. in order to process the convolution operation (e.g., multiply-accumulation (MAC) operations) of the neural network described above with reference to FIGS. 2A and 2B. However, even when the processing apparatus 10 corresponds to a CPU, a GPU, or an AP, not the neural processor, arithmetic operation logics for processing various instructions are necessary, and thus, the processing unit 112 may include a plurality of adder circuits, a plurality of multiplier circuits, etc.

According to the example, with respect to m input operands (m is a natural number) each having an n-bit precision (n is a natural number) for performing the add operation, the input operands are divided into bit sections each having a predetermined bit size that is less than n-bit and sub-operands in each bit section are separately processed, without performing the add operations of each of the bits from a least significant bit (LSB) to a most significant bit (MSB) at once, so as to increase an operation throughput of the adder and utilization of the adder.

Hereinafter, an add operation performed by using an adder included in the processing apparatus 10 according to the example will be described in more detail.

Figure 4A:
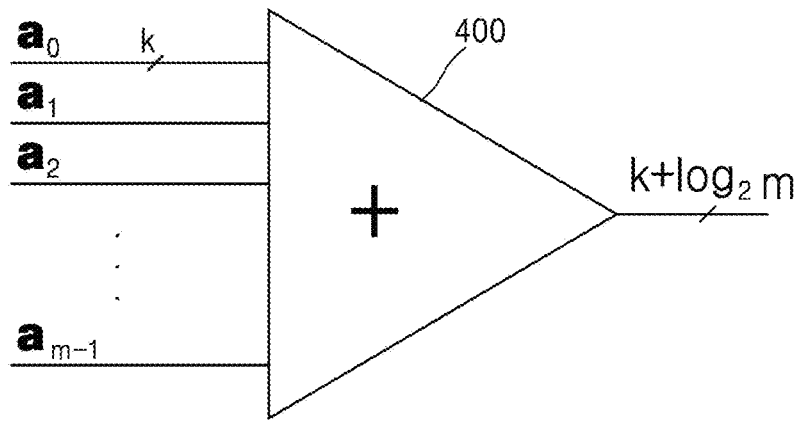
FIG. 4A is a diagram of an adder according to an example.

FIG. 4A is a diagram of an adder 400 according to an example.

Referring to FIG. 4A, the adder 400 included in the processing apparatus 10 (that is, the processing unit 112) is a multi-input adder for performing add operations on m operands (a0, a1, a2, . . . , am−1), and each of the operands has a k-bit precision (k is a natural number). Therefore, the adder 400 has a k-bit precision, and an output of the add operation has a precision of (k+$\log_2$ m). The processing unit 112 of FIG. 3 may include at least one adder 400 of FIG. 4A, in order to process the add operations. However, the adder included in the processing unit 112 may have multi-inputs, the number of which is different from that of the adder 400 of FIG. 4A, and may also have a precision different from that of the adder 400 of FIG. 4A.

Figure 4B:
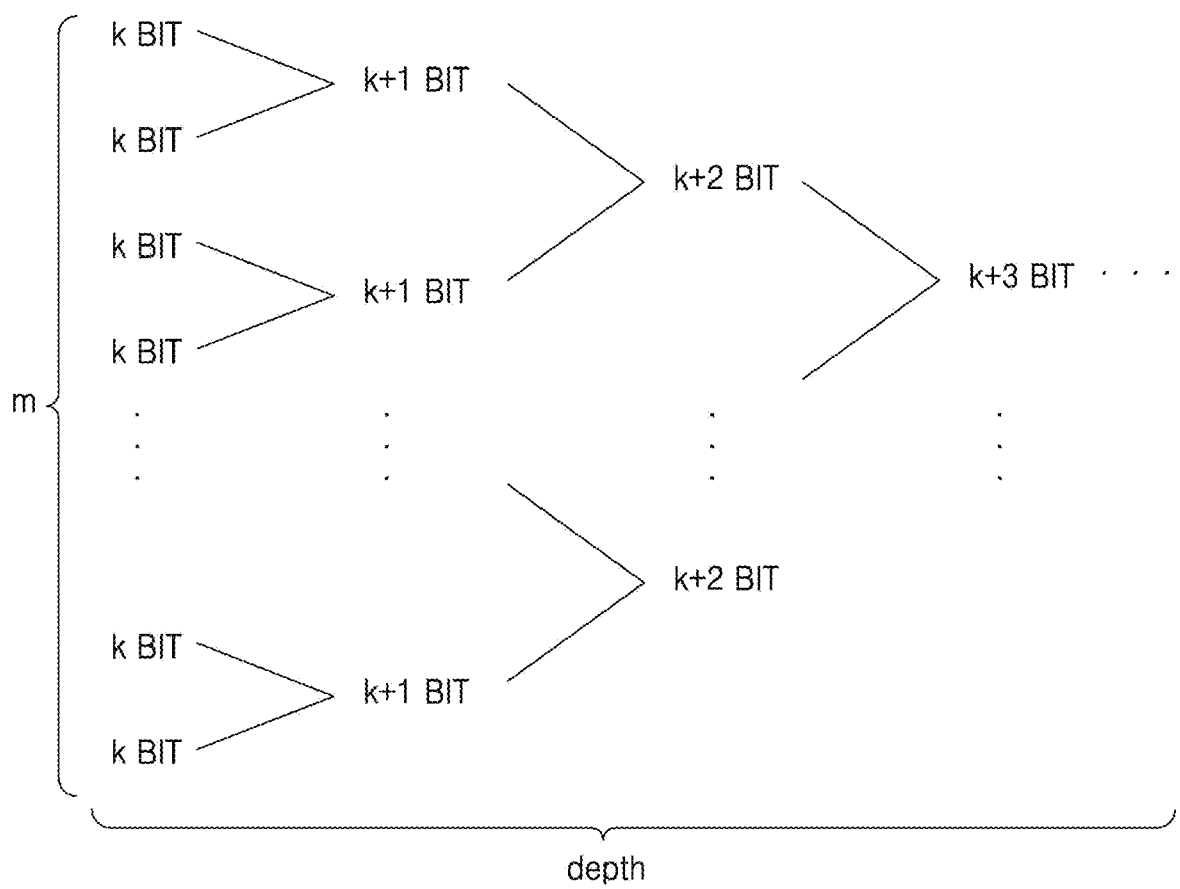
FIG. 4B is a diagram illustrating an input accuracy and an output accuracy of the adder.

FIG. 4B is a diagram illustrating an input precision and an output precision of the adder 400.

Referring to FIG. 4B, when multi-operands having a k-bit precision are input to the adder 400, a precision of the add operation result may be determined according to the number of multi-operands. That is, when the number of the multi-operands is m, as described above, the precision of the add operation result corresponds to (k+$\log_2$ m) bits. Here, ($\log_2$ m) bit corresponds to a carry bit of the add operation.

Figure 5:
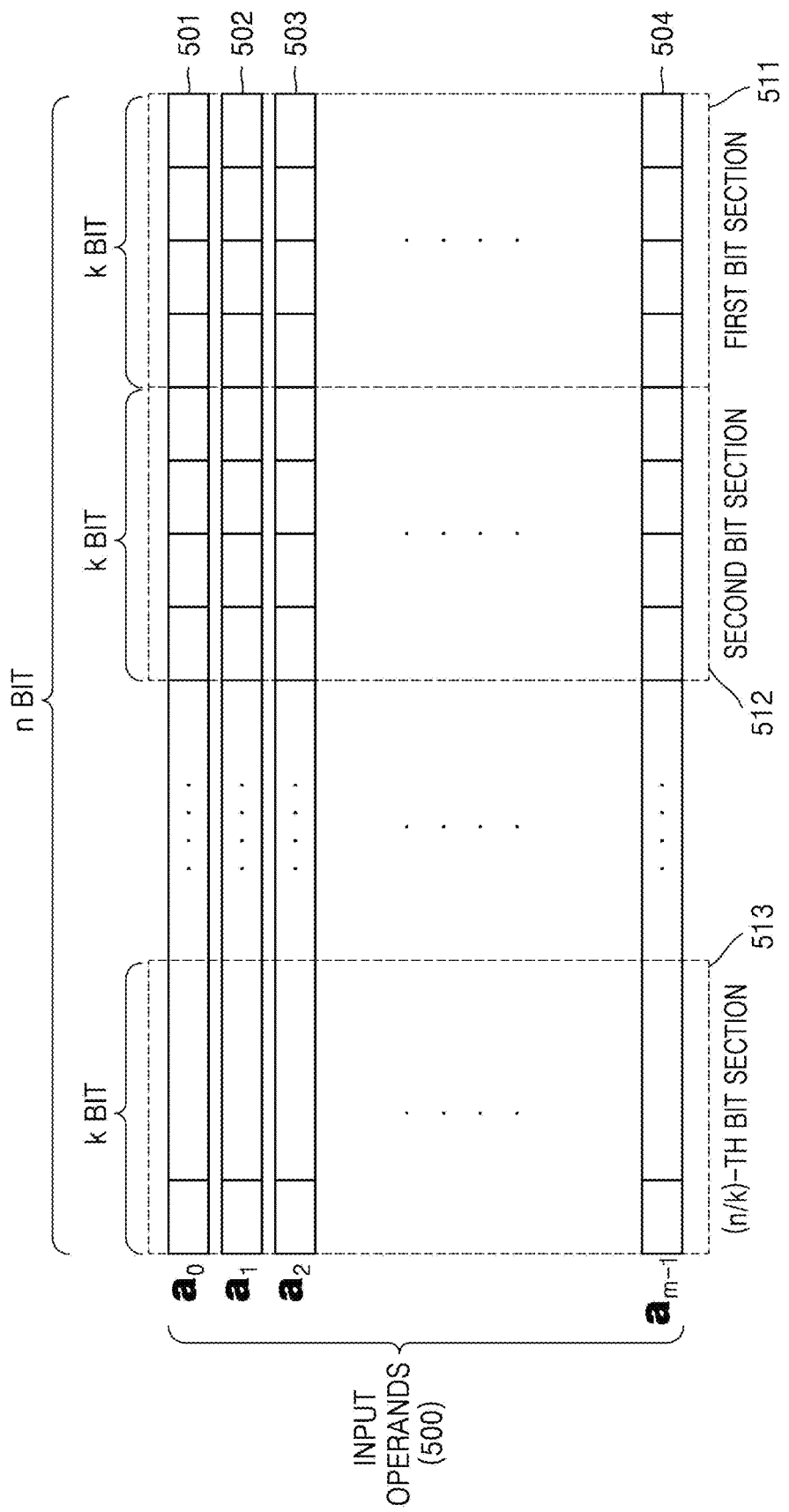
FIG. 5 is a diagram illustrating obtaining of sub-operands from input operands for an add operation, according to an example.

FIG. 5 is a diagram illustrating obtaining of sub-operands from input operands for add operation, according to an example.

Referring to FIG. 5, the processing apparatus (processing apparatus 10 of FIG. 3) (that is, the processing unit 112 of FIG. 3) divides m input operands 500 each having an n-bit precision, which are input to the processing apparatus 10 for the add operation, into bit sections each having a k-bit size, to obtain sub-operands 511, 512, and 513 each corresponding to a bit value of each of the bit sections.

An input operand a0 501 is divided into a sub-operand 511 of a first bit section, a sub-operand 512 of a second bit section, . . . , and a sub-operand 513 of an (n/k)-th bit section. That is, the input operand of the n-bit size is divided into (n/k) bit sections each having k-bit size from the LSB of the input operand, and accordingly, (n/k) sub-operands 511, 512, and 513 may be obtained. With respect to an input operand a1 502, an input operand a2 503, . . . , an input operand am−1 504, sub-operands corresponding to the bit sections may be obtained in the same manner as that used in the input operand a0 501.

The first bit sections of the input operand a0 501, the input operand a1 502, the input operand a2 503, . . . , the input operand am−1 504 correspond to corresponding bit locations of the sub-operands 511 whose bit values are added when the add operation is performed. Likewise, second bit sections, third bit sections, . . . , (n/k)-th bit sections are bit positions corresponding to one another in the sub-operands, and bit values of which are added when the add operation is performed.

The processing apparatus 10 (that is, the processing unit 112) may increase the operation throughput of the adder and increase the utilization of the adder by independently performing add operations with respect to the sub-operands (k-bit precision) of each bit section (k-bit precision) obtained from each of the m input operands 500. The processing apparatus 10 (that is, the processing unit 112) may process the add operation by a parallel addition type or a serial addition type.

Figure 6:
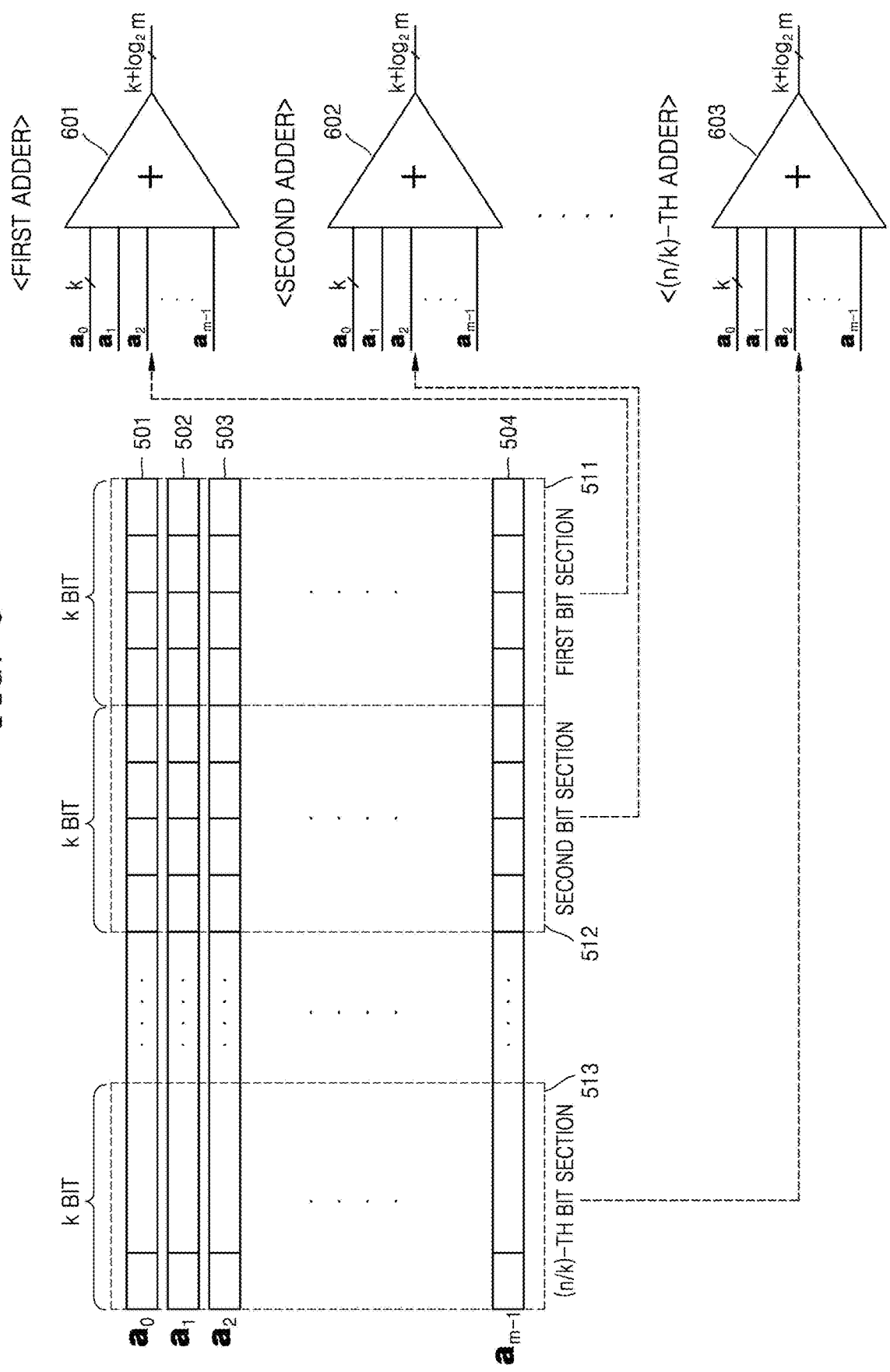
FIG. 6 is a diagram illustrating processing of an add operation by using a parallel addition method, according to an example.

FIG. 6 is a diagram illustrating processing of an add operation by using a parallel addition method, according to an example.

Referring to FIG. 6, as described above with reference to FIG. 5, the processing apparatus (10 of FIG. 3) (that is, the processing unit 112 of FIG. 3) divides the m input operands 501, 502, 503, and 504 each having n-bit precision, which are input to the processing apparatus 10 for the add operation, into first to (n/k)-th bit sections each having a k-bit size, so as to obtain the sub-operands 511, 512, and 513 corresponding respectively to bit values of the first to (n/k)-th bit sections.

The processing apparatus 10 (that is, the processing unit 112) may process the add operation in the parallel addition type by using a parallel adder in which two or more adders 601, 602, and 603 are grouped.

The processing apparatus 10 (that is, the processing unit 112) performs in parallel the add operations among the sub-operands 5011, 512, 513 obtained from corresponding bit sections of the m input operands 501, 502, 503, and 504 by using the plurality of adders 601, 602, and 603, and then obtains intermediate addition results for each bit section.

The sub-operands 511 of the first bit sections respectively from the m input operands 501, 502, 503, and 504 may be input as multi-inputs to the first adder 601. Likewise, the sub-operands 512 of the second bit section may be input as multi-inputs of the second adder 602, . . . , and the sub-operands 513 of the (n/k)-th bit section may be input as multi-inputs of a (n/k)-th adder 603.

Each of the adders 601, 602, and 603 independently processes the add operations of the input sub-operands 511, 512, and 513. Then, the adders 601, 602, and 603 output the intermediate addition results having a (k+$\log_2$ m) bit precision, which correspond to add operation results of the sub-operands 511, 512, and 513. That is, the first adder 601 processes the add operation of the sub-operands 511 and outputs the intermediate addition result having the (k+$\log_2$ m) bit precision corresponding to the first bit section. Likewise, the adders 602 and 603 may respectively output the intermediate addition results having (k+$\log_2$ m) bit precision, which correspond respectively to the bit sections.

Therefore, the intermediate addition results include the intermediate addition results among the sub-operands 511 of the first bit sections from the input operands 501, 502, 503, and 504 to the intermediate addition results among the sub-operands 513 of the (n/k)-th bit section from the input operands 501, 502, 503, and 504, wherein the additions are performed in parallel by each of the adders 601, 602, and 603. The intermediate addition results may be stored on the on-chip memory 114 for obtaining final addition results.

Figure 7:
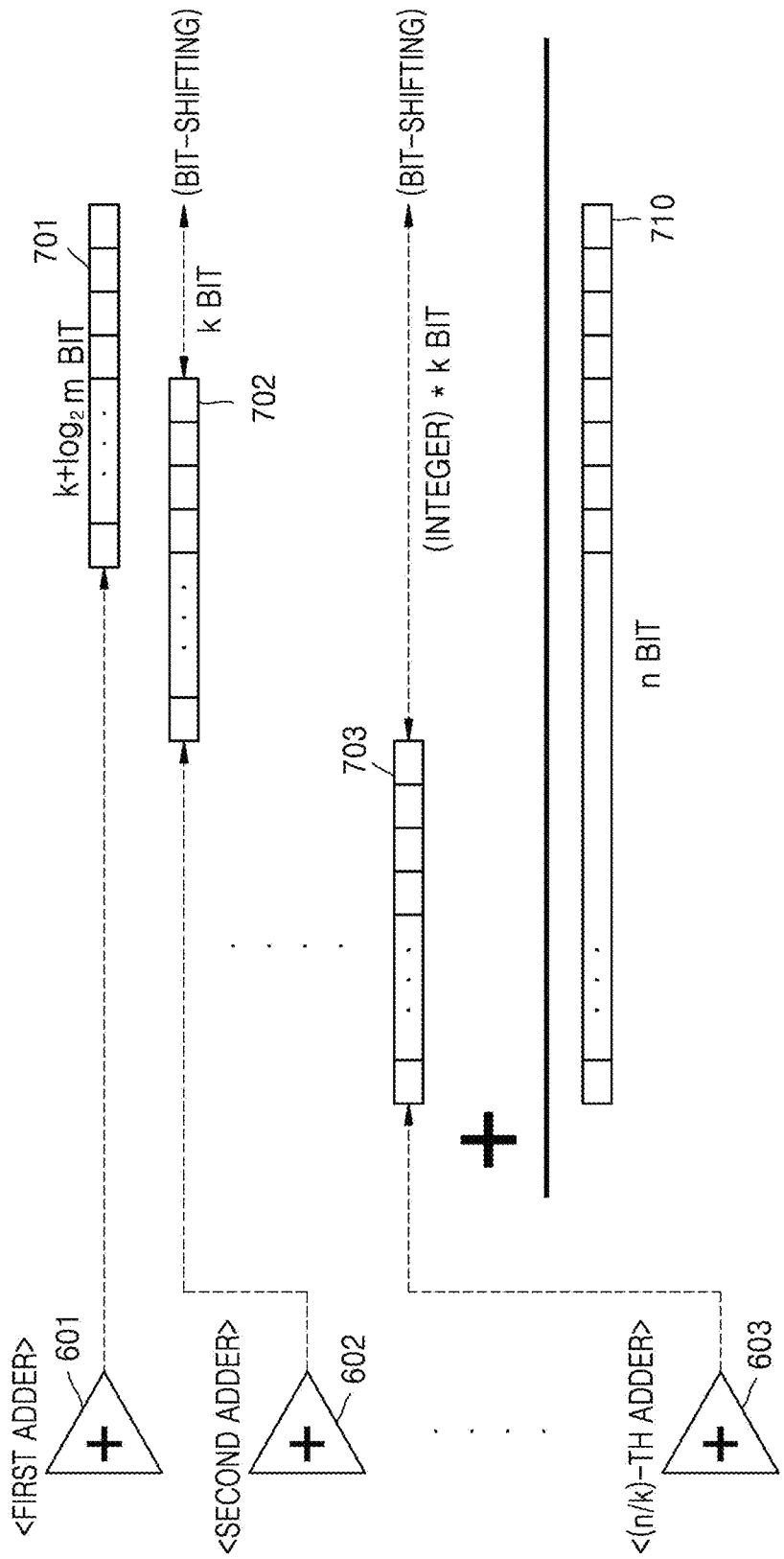
FIG. 7 is a diagram illustrating obtaining of a final add operation result between input operands by using intermediate addition results obtained according to the parallel addition method of FIG. 6, according to an example.

FIG. 7 is a diagram illustrating obtaining of final add operation result between input operands by using intermediate addition results obtained according to the parallel addition method of FIG. 6, according to an example.

Referring to FIG. 7, intermediate addition results 701, 702, and 703 each having the (k+$\log_2$m) bit precision may be obtained from the adders 601, 602, and 603. The intermediate addition result 701 is the addition result of the bit locations corresponding to the first bit section that includes LSBs of the input operands 501 to 504. However, the intermediate addition results 702 and 703 are addition results at bit locations that are separated from the LSBs of the input operands 501 to 504 by an integer multiple of the k bit.

Therefore, the processing apparatus 10 (that is, the processing unit 112 of FIG. 3) bit-shifts each of the obtained intermediate addition results 701, 702, and 703, so that the intermediate addition results 701, 702, and 703 may correspond to original bit positions in the input operands 501 to 504. For example, the intermediate addition result 702 may be bit-shifted by the k bits.

When all of the intermediate addition results 701, 702, and 703 are bit-shifted to correspond to the original bit positions, the processing apparatus 10 (that is, the processing unit 112) processes add operation of the bit-shifted intermediate addition results 701, 702, and 703 and outputs a final result 710 of the add operations on the input operands 501 to 504.

In addition, the processing apparatus 10 (that is, the processing unit 112) may determine whether there is a zero-bit section, in which sub-operands all have a value of zero, from among the first bit section to the (n/k)-th bit section. When it is determined that there is the zero-bit section, the processing apparatus 10 (that is, the processing unit 112) may control one of the adders 601 to 603, which is allocated to the zero-bit section, to skip the add operation. The adder allocated to the zero-bit section may be controlled to perform the add operation of other input operands than the input operands 501 to 504. That is, the adder allocated to the zero-bit section is not in an idling state, but may be controlled to process another input, and thus, the operation may be effectively processed.

Figure 8:
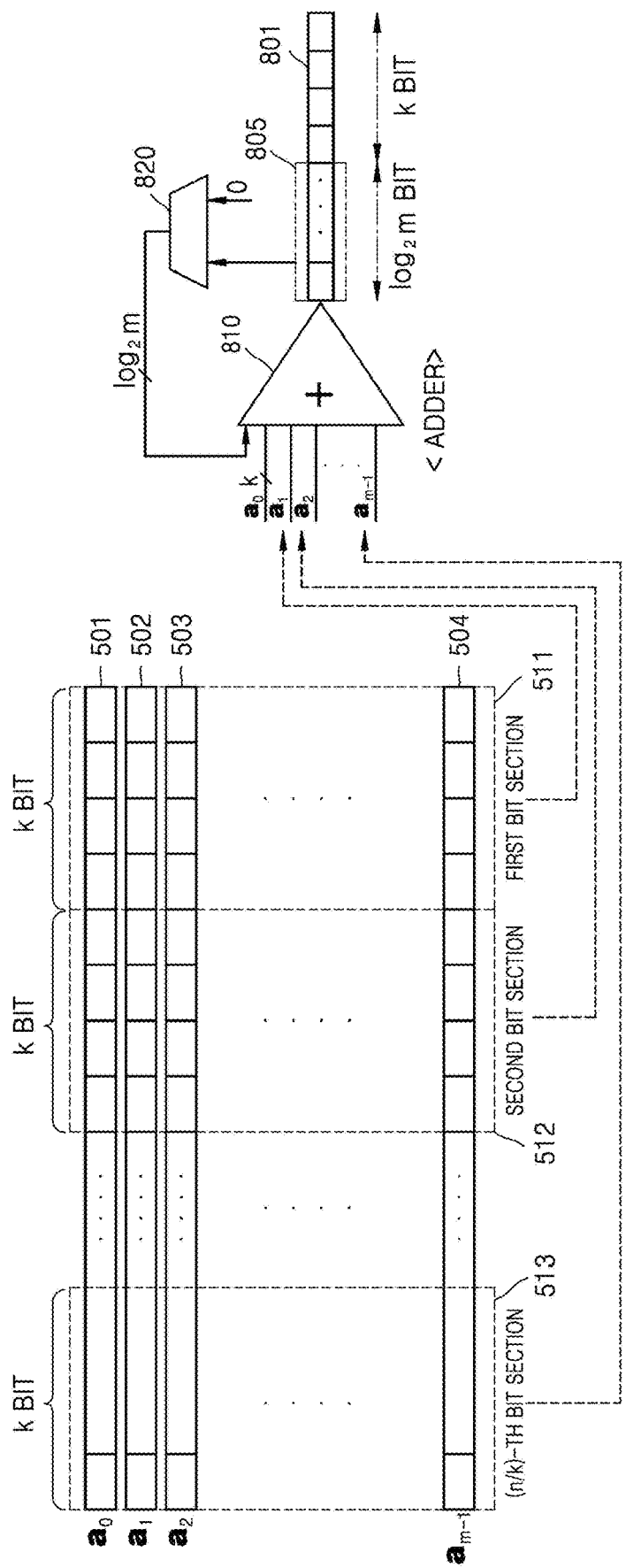
FIG. 8 is a diagram illustrating processing of an add operation by using a serial addition method, according to an example.

FIG. 8 is a diagram illustrating processing of an add operation by using a serial addition method, according to an embodiment.

Referring to FIG. 8, unlike the parallel addition type, the serial addition type may process the add operation by using only one adder 810.

As described above with reference to FIG. 5, the processing apparatus (10 of FIG. 3) (that is, the processing unit 112 of FIG. 3) divides the m input operands 501, 502, 503, and 504 each having n-bit precision, which are input to the processing apparatus 10 for the add operation, into first to (n/k)-th bit sections each having a k-bit size, so as to obtain the sub-operands 511, 512, and 513 corresponding respectively to bit values of the first to (n/k)-th bit sections.

The processing apparatus 10 (that is, the processing unit 112) obtains intermediate addition result for each bit section, by repeatedly performing an addition operation of the sub-operands 511, 512, and 513 obtained from corresponding bit sections of the input operands 501, 502, 503, and 504 and a carry 805 output from an add operation of a previous cycle through a plurality of cycles according to an order of the bit sections (first bit section to the (n/k)-th bit section) by using the adder 810. That is, in each cycle, the sub-operands corresponding to a bit section having a k-bit size from the LSBs of the input operands 501, 502, 503, and 504 are input sequentially to the adder 810 and added repeatedly.

In a first cycle, the adder 810 processes the add operation of the sub-operands 511 of the first bit section, and outputs an intermediate addition result 801 having (k+log$_2$m) bit precision. Here, since a bit value of (log$_2$ m) bits from the MSB of the intermediate addition result 801 corresponds to the carry 805, the carry 805 is fed-back as an input to the adder 810 for the add operation of a second cycle. In the second cycle, the adder 810 processes the add operation of the sub-operands 512 of the second bit section and the carry 805, and outputs the intermediate addition result 801 having (k+log$_2$ m)-bit precision. In the above manner, the adder 810 repeatedly performs the add operations during (n/k) cycles, and outputs the intermediate addition result 801 in each cycle. However, since (log$_2$ m) bits from the MSB in the intermediate addition result 801 obtained from the last cycle does not need to be fed-back as the input of the adder 810, the (log$_2$ m) bits may be set as 0 by using a 2-to-1 multiplexer 820.

The intermediate addition results 801 obtained by the adder 810 in the serial addition type are stored on the on-chip memory 114 for obtaining a final additional result.

When acquisition of the intermediate addition results 801 with respect to the input operands 501, 502, 503, and 504 is finished, similarly to FIG. 7, the processing apparatus 10 (that is, the processing unit 112) bit-shifts each of the intermediate addition results 801 so that the intermediate addition results 801 may correspond to original bit positions in the input operands 501, 502, 503, and 504. When all of the intermediate addition results 801 are bit-shifted to correspond to the original bit positions, the processing apparatus 10 (that is, the processing unit 112) processes add operation of the bit-shifted intermediate addition results 801 and outputs a final result of the add operations on the input operands 501 to 504.

For example, when an input operand having a precision of 16 bits (n=16) is grouped as four sub-operands (k=4), the adder 810 may finish add operations of a total of four cycles. Moreover, when the input operand has the precision of 8 bits, the adder 810 may finish the add operations of a total of two cycles, and when the input operand has a precision of 4 bits, the adder 810 may finish the add operation of one cycle.

As described above with reference to accompanying drawings, the processing apparatus 10 (that is, the processing unit 112) performs the add operations independently with respect to sub-operands having the k-bit precision, wherein the sub-operands are grouped from m input operands each having an n-bit precision. When there is a zero-bit section among the bit sections as described above, the processing apparatus 10 (that is, the processing unit 112) may schedule add operations with respect to other input operands than the current input operands on the adder, and thus, the add operations may be processed effectively. Also, even when the adders of restricted resources may be provided in the processing apparatus 10 (that is, the processing unit 112), the add operations may be processed according to optimized schedule by using the restricted number of adders after adjusting the precision (n-bit) of the input operand and the precision (k-bit) of the sub-operand. That is, the adder provided in the processing apparatus 10 may be implemented as a reconfigurable adder design. In addition, when the processing apparatus 10 corresponds to the neural processor, the processing apparatus 10 may perform the convolution operation (MAC operation) of the input feature maps, the kernels, etc. in the neural network according to an optimized schedule, and thus, a processing speed of the neural network may be improved.

Figure 9:
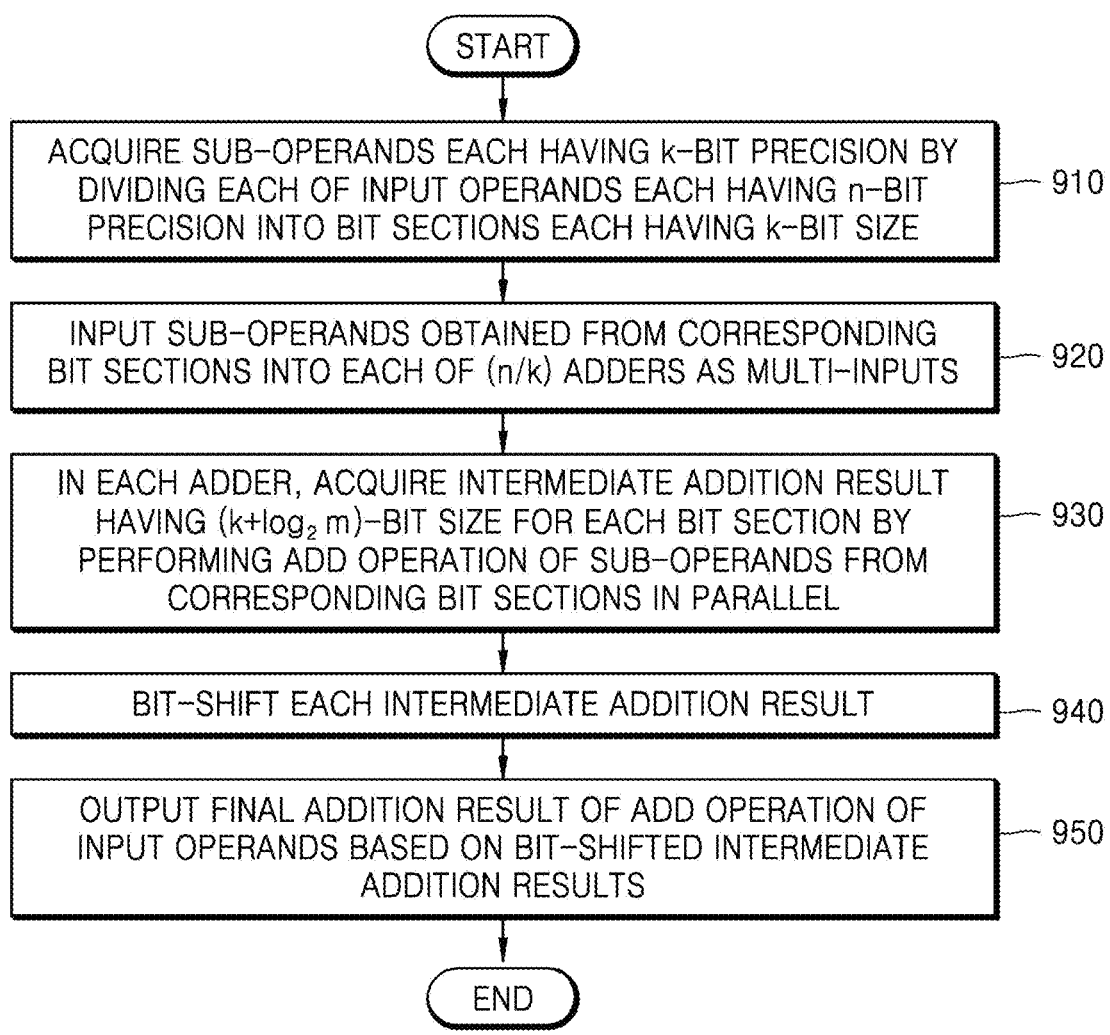
FIG. 9 is a flowchart illustrating a method of processing an add operation by using a parallel addition method, according to an example.

FIG. 9 is a flowchart illustrating a method of processing add operation by using a parallel addition method, according to an example. Referring to FIG. 9, the method of processing the add operation in the parallel addition type is related to the examples described above with reference to the accompanying drawings, and thus, the descriptions provided above may be also applied to the method of FIG. 9 even when they are omitted.

In operation 910, the processing unit 112 acquires sub-operands each having a k-bit precision by dividing each of the input operands each having the n-bit precision into bit sections each having the k-bit size.

In operation 920, the processing unit 112 inputs the sub-operands obtained from corresponding bit sections to (n/k) adders as multi-inputs.

In operation 930, the processing unit 112 acquires intermediate addition results of (k+log$_2$ m) bits for respective bit sections, by processing in parallel the add operations of the sub-operands of the corresponding bit sections in the adders.

In operation 940, the processing unit 112 bit-shifts the intermediate addition results such that the intermediate addition results may respectively correspond to original bit positions in the input operands.

In operation 950, the processing unit 112 outputs a final addition result of the add operations of the input operands based on the bit-shifted intermediate addition results.

Figure 10:
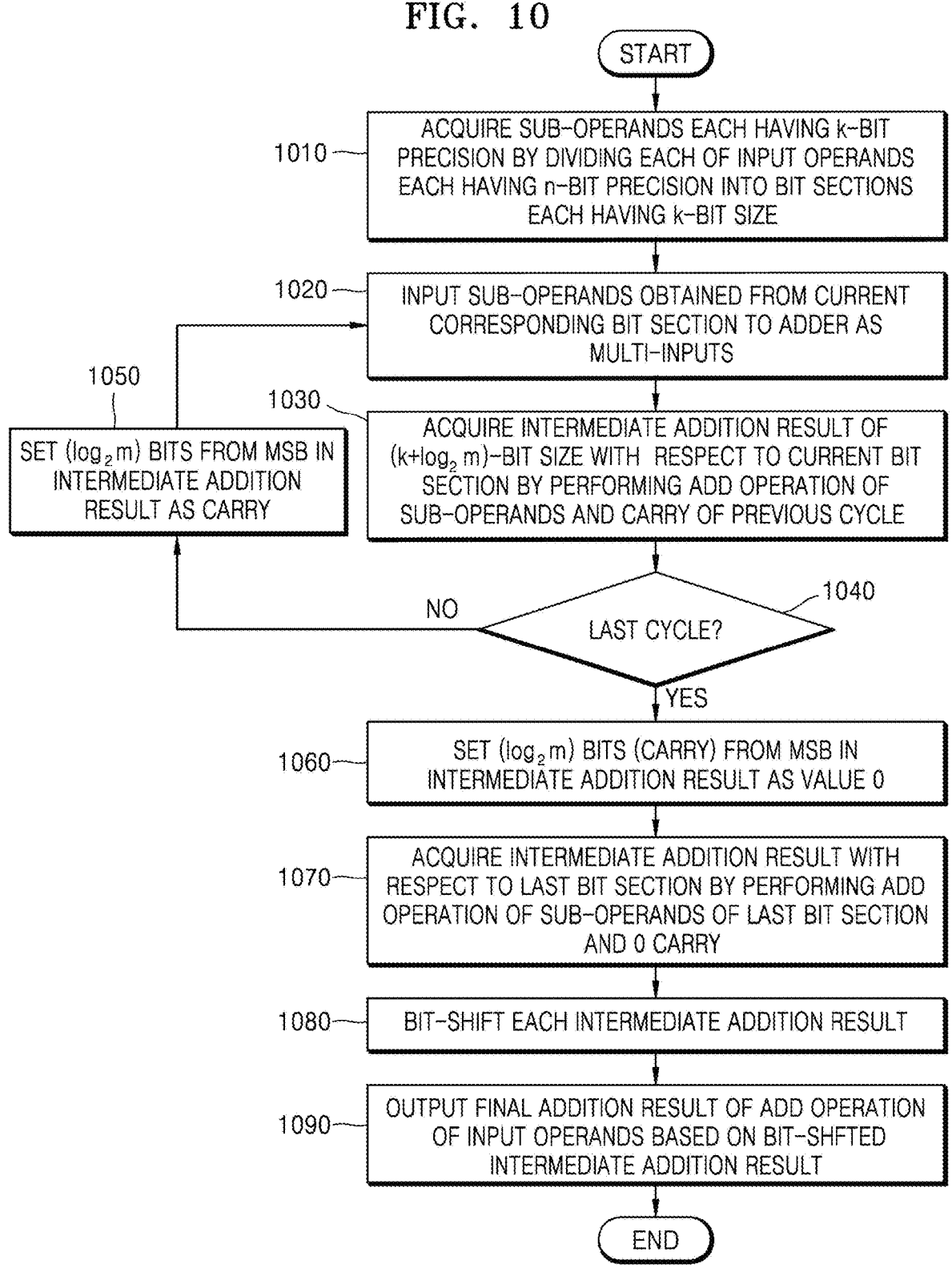
FIG. 10 is a flowchart illustrating a method of processing an add operation by using a serial addition method, according to an example.

FIG. 10 is a flowchart illustrating a method of processing add operation by using a serial addition method, according to an example. Referring to FIG. 10, the method of processing the add operation in the serial addition type is related to the examples described above with reference to the accompanying drawings, and thus, the descriptions provided above may be also applied to the method of FIG. 10 even when they are omitted.

In operation 1010, the processing unit 112 acquires sub-operands each having a k-bit precision by dividing each of the input operands each having the n-bit precision into bit sections each having the k-bit size.

In operation 1020, the processing unit 112 inputs the sub-operands obtained from current bit section to an adder as multi-inputs.

In operation 1030, the processing unit 112 acquires an intermediate addition result of $(k+\log_2 m)$ bits with respect to the current bit section, by processing the add operation of the sub-operands and a carry of a previous cycle.

In operation 1040, the processing unit 112 determines whether the add operation of the sub-operands in the current bit section is the add operation of the last cycle. When the current add operation is not from the last cycle, the process goes to operation 1050. When the current add operation is from the last cycle, the process goes to operation 1060.

In operation 1050, the processing unit 112 sets $(\log_2 m)$ bits from the MSB in the intermediate addition result obtained in operation 1030 as a carry for the add operation of next bit section, wherein the add operation is to be performed in next cycle. Then, operations 1020 to 1040 are performed again.

In operation 1060, the processing unit 112 sets $(\log_2 m)$ bits (carry) from the MSB in the intermediate addition result obtained in operation S1030 to have a value of 0.

In operation 1070, the processing unit 112 acquires the intermediate addition result of the last bit section by processing an add operation of the sub-operands of the last bit section and the carry (0).

In operation 1080, the processing unit 112 bit-shifts the intermediate addition results so that the intermediate addition results may respectively correspond to original bit positions in the input operands.

In operation 1090, the processing unit 112 outputs a final addition result of the add operations of the input operands based on the bit-shifted intermediate addition results.

Figure 11:
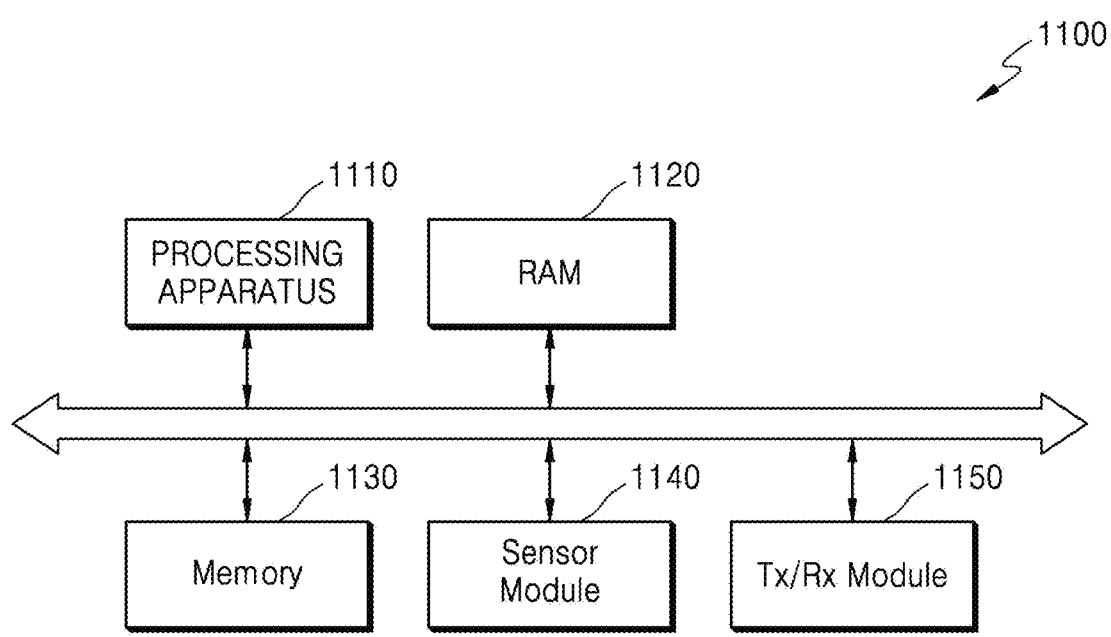
FIG. 11 is a block diagram of an electronic system according to an example.

FIG. 11 is a block diagram of an electronic system 1100 according to an example.

Referring to FIG. 11, the electronic system 1100 extracts valid information by analyzing input data in real-time, and may judge situation or control elements of an electronic device, in which the electronic system 1100 is mounted, based on the extracted information. For example, the electronic system 1100 may be applied to a robot device such as a drone and an advanced drivers assistance system (ADAS), a smart television (TV), a smartphone, a medical device, a mobile device, an image display device, a measurement device, an IoT device, etc., and may be mounted in at least one of various kinds of electronic devices.

The electronic system 1100 may include a processing apparatus 1110, a random access memory (RAM) 1120, a memory 1130 (off-chip memory), a sensor module 1140, and a communication (Tx/Rx) module 1150. The electronic system 1100 may further include an input/output module, a security module, a power control device, etc. Some of hardware elements of the electronic system 1100 may be mounted on one semiconductor chip. The processing apparatus 1110 may correspond to the processing apparatus 10 that processes the add operation described above.

The processing apparatus 1110 controls overall operations of the electronic system 1100. The processing apparatus 1110 may include one processor core (single core) or a plurality of processor cores (multi-core). The processing apparatus 1110 may process or execute programs and/or data stored on the memory 1130. In one example, the processing apparatus 1110 may control various functions by executing the programs stored on the memory 1130. The processing apparatus 1110 may include a central processing unit (CPU), a graphics processing unit (CPU), an application processor (AP), a neural processor, etc.

The RAM 1120 may temporarily store programs, data, or instructions. For example, the programs and/or data stored on the memory 1130 may be temporarily stored in the RAM 1120 according to the control of the processing apparatus 1110 or booting code. The RAM 1120 may be implemented as a memory such as dynamic RAM (DRAM) or static RAM (SRAM).

For example, the processing apparatus 1110 performs operations of the neural network based on the received input data, and may generate information signals based on an execution result. The neural network may include, but is not limited to, convolutional neural networks (CNN), recurrent neural networks (RNN), deep belief networks, restricted Boltzman machines, etc.

The information signal may include one of various kinds of recognition signals such as a voice recognition signal, an object recognition signal, an image recognition signal, a bio-information recognition signal, etc. For example, the processing apparatus 1110 may receive frame data included in a video stream as input data, and may generate from the frame data a recognition signal of an object included in an image represented by the frame data. However, the configuration is not limited thereto, that is, the processing apparatus 1110 may receive various kinds of input data according to a kind or a function of the electronic device, in which the electronic system 1100 is mounted, and may generate a recognition signal according to the input data.

The memory 1130 is a storage for storing data, and may store an operating system (OS), various programs, and various pieces of data. In one example, the memory 1130 may store intermediate results generated during the operating process of the processing apparatus 1110, for example, output feature maps, in the form of an output feature list or an output feature matrix. In one example, the memory 1130 may store a contracted output feature map. Also, the memory 1130 may store quantized neural network data used in the processing apparatus 1110, for example, parameters, weight map, or a weight list.

The memory 1130 may include a DRAM, but is not limited to such a configuration. The memory 1130 may include at least one of a volatile memory and a non-volatile memory. The non-volatile memory may include ROM, PROM, EPROM, EEPROM, flash memory, PRAM, MRAM, RRAM, FRAM, etc. The volatile memory may include DRAM, SRAM, SDRAM, PRAM, MRAM, RRAM, FeRAM, etc. In one example, the memory 1130 may include at least one selected from HDD, SSD, CF, SD, Micro-SD, Mini-SD, xD, and memory stick.

The sensor module 1140 may collect information around the electronic device in which the electronic system 1100 is mounted. The sensor module 1140 senses or receives signals (e.g., an image signal, a voice signal, a magnetic signal, a bio-signal, a touch signal, etc.) from outside of the electronic device, and may convert the sensed or received signal into data. To do this, the sensor module 1140 may include at least one of various kinds of sensing devices, e.g., a microphone, an image capturing device, an image sensor, a light detection and ranging (LIDAR) sensor, an ultrasound sensor, an infrared ray sensor, a bio-sensor, and a touch sensor.

The sensor module 1140 may provide the processing apparatus 1110 with the converted data as input data. For example, the sensor module 1140 may include an image sensor, and may generate a video stream by capturing images of the external environment of the electronic device, and provide successive data frames of the video stream to the processing apparatus 1110 as input data. However, the configuration is not limited thereto, and the sensor module 1140 may provide the processing apparatus 1110 with various kinds of data.

The communication module 1150 may include various wired or wireless interfaces capable of communicating with an external device. For example, the communication module 1150 may include local area network (LAN), wireless local area network (WLAN) such as wireless fidelity (Wi-Fi), wireless personal area network (WPAN) such as Bluetooth, wireless universal serial bus (USB), Zigbee, near field communication (NFC), radio-frequency identification (RFID), power line communication (PLC), or a communication interface accessible to a mobile cellular network such as 3rd generation (3G), 4th generation (4G), long term evolution (LTE), 5th generation (5G), etc.

In one example, the communication module 1150 may receive data regarding the neural network from outside.

Figure 12:
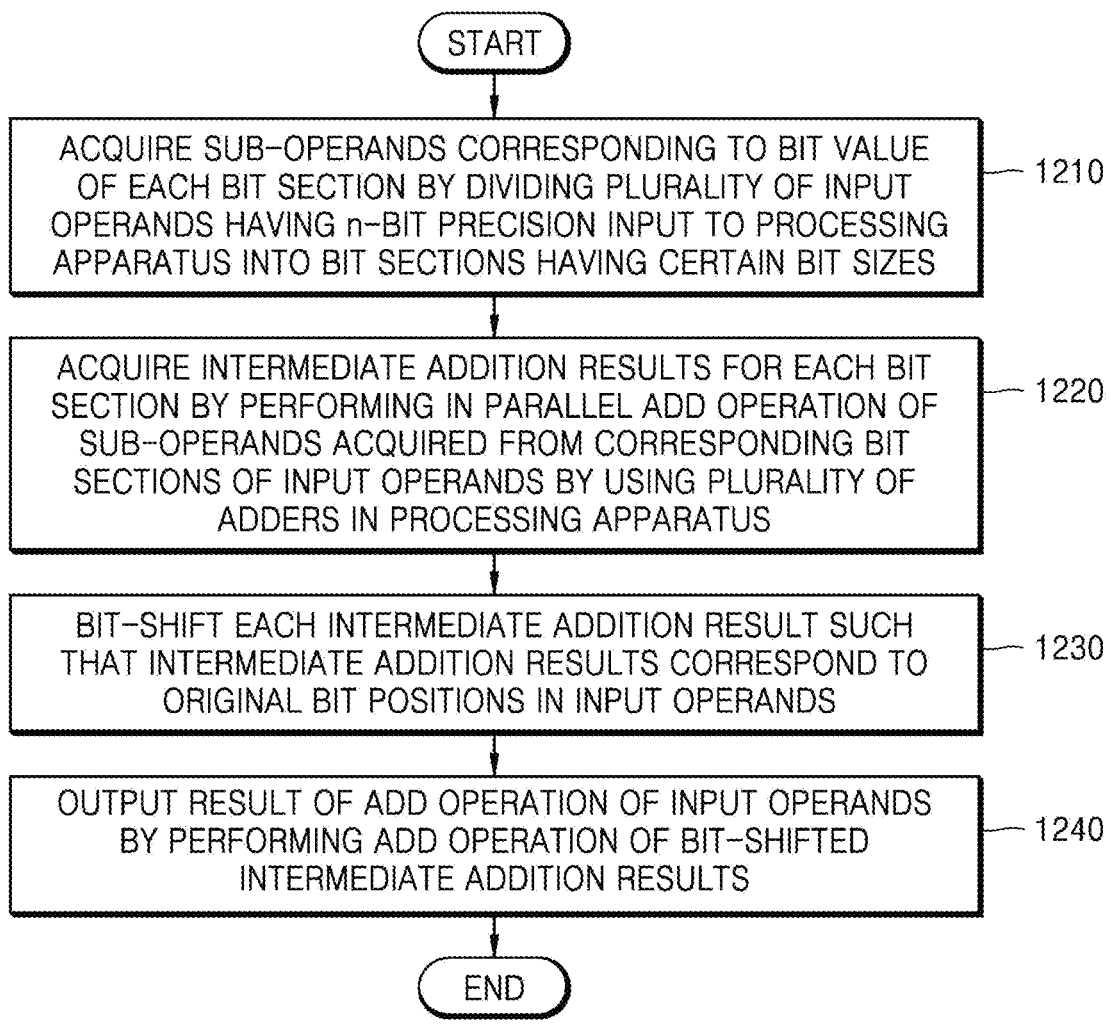
FIG. 12 is a flowchart illustrating a method of processing an add operation in a processing apparatus according to an example.

FIG. 12 is a flowchart illustrating a method of processing an add operation in a processing apparatus according to an example. Referring to FIG. 12, the method of processing the add operation (parallel addition type) is related to the examples described above with reference to the accompanying drawings, and thus, the descriptions provided above may be also applied to the method of FIG. 12 even when they are omitted.

In operation 1210, the processing unit 112 acquires sub-operands corresponding to the bit values of respective bit sections by dividing a plurality of input operands having n-bit precision, which are input to the processing apparatus 10, into the bit sections of a predetermined bit size.

In operation 1220, the processing unit 112 acquires intermediate addition results with respect to each of the bit sections by performing in parallel the add operations of the sub-operands that are obtained from corresponding bit sections in the input operands by using a plurality of adders included in the processing apparatus 10.

In operation 1230, the processing unit 112 bit-shifts each of the intermediate addition results such that the intermediate addition results may respectively correspond to original bit positions in the input operands.

In operation 1240, the processing unit 112 outputs a result of the add operations of the input operands by performing add operations of the bit-shifted intermediate addition results.

Figure 13:
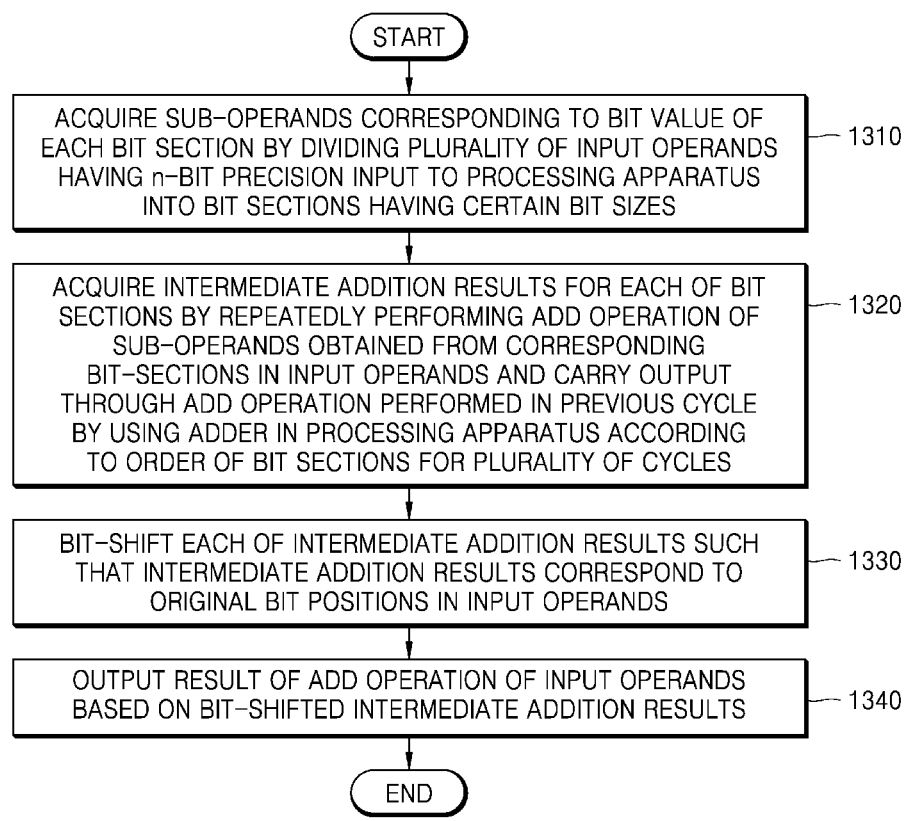
FIG. 13 is a flowchart illustrating a method of processing an add operation in a processing apparatus according to an example.

FIG. 13 is a flowchart illustrating a method of processing an add operation in a processing apparatus according to an example. Referring to FIG. 13, the method of processing the add operation (serial addition type) is related to the examples described above with reference to the accompanying drawings, and thus, the descriptions provided above may be also applied to the method of FIG. 13 even when they are omitted.

In operation 1310, the processing unit 112 acquires sub-operands corresponding to the bit values of respective bit sections by dividing a plurality of input operands having n-bit precision, which are input to the processing apparatus 10, into bit sections of a predetermined bit size.

In operation 1320, the processing unit 112 acquires intermediate addition results with respect to each of the bit sections by repeatedly performing add operations of the sub-operands obtained from the corresponding bit sections in the input operands and the carry output through the add operation performed in the previous cycle for a plurality of cycles according to an order of the bit sections by using the adder included in the processing apparatus 10.

In operation 1330, the processing unit 112 bit-shifts each of the intermediate addition results so that the intermediate addition results may respectively correspond to original bit positions in the input operands.

In operation 1340, the processing unit 112 outputs a result of the add operations of the input operands based on the bit-shifted intermediate addition results.

Examples described above may be implemented in a general purpose digital computer to be written as a program that may be executed on a computer, and operate the programs using a computer readable recording medium. Also, structure of the data used in the above examples may be recorded on a computer-readable recording medium via various units. Examples of the computer readable recording medium include magnetic storage media (e.g., ROM, floppy disks, hard disks, etc.), optical recording media (e.g., CD-ROMs, or DVDs), etc.

It will be understood by those of ordinary skill in the art that various changes in form and details may be made therein without departing from the spirit and scope of the disclosure as defined by the appended claims. The examples should be considered in descriptive sense only and not for purposes of limitation. Therefore, the scope of the disclosure is defined not by the detailed description of the disclosure but by the appended claims, and all differences within the scope will be construed as being included in the present disclosure.

It should be understood that examples described herein should be considered in a descriptive sense only and not for purposes of limitation. Descriptions of features or aspects within each example should typically be considered as available for other similar features or aspects in other examples.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of a processor including a plurality of adder circuitries, the method comprising:

generating a plurality of sub-operands, respectively corresponding to bit values of bit sections of a plurality of operands of an input feature map of a neural network, having a first pixel configuration, by dividing the plurality of operands into the bit sections each having a predetermined bit size, wherein each of the plurality of operands has an n-bit precision, and n is a natural number;

generating respective intermediate bit results by operating the plurality of adder circuitries in parallel through each of the plurality of adder circuitries being provided respective multiple sub-operands of the plurality of sub-operands;

generating an output feature map, having a second pixel configuration different from the first pixel configuration, by combining bit-shifted intermediate bit results that result from respective bit-shiftings of the respective intermediate bit results based on respective bit positions in the plurality of operands, such that the combined bit-shifted intermediate bit results correspond to a summation result for the plurality of operands; and dependent on a performed determination that there is a zero-bit section, among the bit sections, in which a corresponding sub-operand has a zero-value:

in the operating of the plurality of adder circuitries in parallel, controlling a corresponding one adder circuitry, of the plurality of adder circuitries, allocated to the zero-bit section to not operate with respect to the corresponding sub-operand, thereby skipping performance of an add operation with respect to the corresponding sub-operand; and controlling the corresponding one adder circuitry to operate with respect to an other operand, other than the plurality of operands, to decrease an idling of the corresponding one adder circuitry.

2. The method of claim 1, wherein the predetermined bit size is k bits, the generating of the respective intermediate bit results comprises generating the respective intermediate bit results by using multi-input adder circuitries each having a k-bit precision performing add operations of the respective multiple sub-operands each having a k-bit precision, and k is a natural number less than n.

3. The method of claim 2, wherein a total number of the plurality of operands is m, each of the respective intermediate bit results comprises a result of executing an add operation of m sub-operands, each having the k-bit precision, acquired from each corresponding bit section in the m operands, each of the respective intermediate bit results has a precision of (k+log 2m) bits, and m is a natural number.

4. The method of claim 3, wherein each of the plurality of operands is divided into (n/k) bit sections, and the respective intermediate bit results comprise intermediate bit results from an intermediate bit result of sub-operands of a first bit section of each of the plurality of operands to an intermediate bit result of sub-operands of (n/k)-th bit section of each of the plurality of operands.

5. The method of claim 4, further comprising performing the determination that there is the zero-bit section by determining whether there is the zero-bit section in which the corresponding sub-operand has the zero-value from among the first bit section to the (n/k)-th bit section, wherein the controlling of the corresponding one adder circuitry to not operate with respect to the corresponding sub-operand and to operate with respect to the other operand is performed for avoiding the corresponding one adder circuitry from being in an idling state during the generating of the respective intermediate bit results.

6. The method of claim 2, further comprising performing the respective bit-shiftings of the respective intermediate bit results, including bit-shifting each of the respective intermediate bit results by integer-multiple-of-k bits to correspond to the respective bit positions in each of the plurality of operands.

7. A processing apparatus comprising:

one or more memories storing instructions; and one or more processors configured to execute the instructions, wherein the execution of the instructions configures the one or more processors to:

generate a plurality of sub-operands, respectively corresponding to bit values of bit sections of a plurality of operands of an input feature map of a neural network, having a first pixel configuration, by dividing the plurality of operands into the bit sections each having a certain bit size, wherein each of the plurality of operands has an n-bit precision, and n is a natural number;

generate respective intermediate bit results by operating a plurality of adder circuitries in parallel through each of the plurality of adder circuitries being provided different respective multiple sub-operands of the plurality of sub-operands;

generate an output feature map, having a second pixel configuration different from the first pixel configuration, by combining bit-shifted intermediate bit results that result from respective bit-shiftings of the respective intermediate bit results based on respective bit positions in the plurality of operands, such that the combined bit-shifted intermediate bit results correspond to a summation result for the plurality of operands; and dependent on a performed determination that there is a zero-bit section, among the bit sections, in which a corresponding sub-operand has a zero-value:

in the operating of the plurality of adder circuitries in parallel, control a corresponding one adder circuitry, of the plurality of adder circuitries, allocated to the zero-bit section to not operate with respect to the corresponding sub-operand, thereby skipping performance of an add operation with respect to the corresponding sub-operand; and control the corresponding one adder circuitry to operate with respect to an other operand, other than the plurality of operands, to decrease an idling of the corresponding one adder circuitry.

8. The processing apparatus of claim 7, wherein the certain bit size is k bits, the generation of the respective intermediate bit results comprises generation of the respective intermediate bit results by using multi-input adder circuitries each having a k-bit precision performing add operations of the different respective multiple sub-operands each having a k-bit precision, and k is a natural number less than n.

9. The processing apparatus of claim 8, wherein a total number of the plurality of operands is m, each of the respective intermediate bit results comprises a result of performing an add operation of m sub-operands each having the k-bit precision and obtained from corresponding bit sections in each of the m operands, each of the respective intermediate bit results has a precision of (k+log 2m) bits, and m is a natural number.

10. The processing apparatus of claim 9, wherein each of the plurality of operands is divided into (n/k) sub-operands, and the respective intermediate bit results comprise intermediate bit results from an intermediate bit result of sub-operands of a first bit section of each of the plurality of operands to an intermediate bit result of sub-operands of (n/k)-th bit section of each of the plurality of operands.

11. The processing apparatus of claim 10, wherein the one or more processors is further configured to perform the determination that there is the zero-bit section by determining whether there is the zero-bit section in which the corresponding sub-operand has the zero-value from among the first bit section to the (n/k)-th bit section, and wherein the controlling of the corresponding one adder circuitry to not operate with respect to the corresponding sub-operand and to operate with respect to the other operand is performed for avoiding the corresponding one adder circuitry from being in an idling state during the generating of the respective intermediate bit results.

* * * * *